(12) United States Patent
Chepe et al.

(10) Patent No.: US 11,978,028 B2
(45) Date of Patent: May 7, 2024

(54) METHODS AND SYSTEMS FOR FACILITATING ACCESS OF INTERCHANGE PARAMETERS TO A PLURALITY OF DIGITAL APPLICATIONS

(71) Applicant: MASTERCARD INTERNATIONAL INCORPORATED, Purchase, NY (US)

(72) Inventors: Saumitra Sanjay Chepe, Pune (IN); Shrinivas Ambadas Kalvit, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 107 days.

(21) Appl. No.: 16/802,823

(22) Filed: Feb. 27, 2020

(65) Prior Publication Data

US 2020/0320494 A1 Oct. 8, 2020

(30) Foreign Application Priority Data

Apr. 8, 2019 (SG) .......................... 10201903109Y

(51) Int. Cl.
*G06Q 40/02* (2023.01)
*G06Q 20/10* (2012.01)
(Continued)

(52) U.S. Cl.
CPC .......... *G06Q 20/108* (2013.01); *G06Q 20/34* (2013.01); *G06Q 40/02* (2013.01); *H04L 63/08* (2013.01)

(58) Field of Classification Search
USPC ......................................................... 705/42
See application file for complete search history.

(56) References Cited

U.S. PATENT DOCUMENTS 8,266,057 B2 * 9/2012 Carroll ................... G06Q 40/12
705/14.1
8,433,627 B2 * 4/2013 Agee ...................... G06Q 20/10
705/19

(Continued)

OTHER PUBLICATIONS

Sumanjeet, "Emergence of payment systems in the age of electronic commerce: The state of art," 2009 First Asian Himalayas International Conference on Internet, 2009, pp. 1-18, (Payment Systems). (Year: 2009).*

(Continued)

*Primary Examiner* — Chikaodinaka Ojiaku
(74) *Attorney, Agent, or Firm* — Barta Jones, PLLC

(57) ABSTRACT

Systems and methods for facilitating access of interchange parameter data files through a centralized microservice system that integrates a plurality of interchange network systems with a plurality of payment processing applications. The microservice system comprises a plurality of microservices and a plurality of payment processing application modules hosting the plurality of payment processing applications. The microservice system accesses interchange related information sourced from the plurality of interchange network systems and stores the interchange related information in the plurality of microservices. A plurality of financial entities gets registered with the microservice system for availing services associated with the plurality of payment processing applications. The plurality of payment processing application sends a request to the microservice system to access the interchange related information required for processing of the payment transactions requested by the financial entities. The microservice system provides access of the interchange related information in response to receipt of the request.

20 Claims, 9 Drawing Sheets

(51) Int. Cl.
  *G06Q 20/34* (2012.01)
  *H04L 9/40* (2022.01)

(56) References Cited

U.S. PATENT DOCUMENTS

| | | | | |
|---|---|---|---|---|
| 10,387,850 | B1* | 8/2019 | Srinivasan | G06Q 20/027 |
| 2004/0230525 | A1* | 11/2004 | Barsade | G06Q 40/02 |
| | | | | 705/40 |
| 2008/0294538 | A1* | 11/2008 | Barsade | G06Q 40/12 |
| | | | | 705/40 |
| 2009/0024495 | A1* | 1/2009 | Gilson | G06Q 40/12 |
| | | | | 705/30 |
| 2009/0234748 | A1* | 9/2009 | Skowronek | G06Q 20/145 |
| | | | | 705/34 |
| 2010/0030634 | A1* | 2/2010 | McElroy | G06Q 20/10 |
| | | | | 705/30 |
| 2010/0070359 | A1* | 3/2010 | Heasley | G06Q 30/0215 |
| | | | | 705/14.17 |
| 2011/0101091 | A1* | 5/2011 | Fernandez | G06Q 20/10 |
| | | | | 235/380 |
| 2011/0320354 | A1* | 12/2011 | Coon | G06Q 20/40 |
| | | | | 235/380 |
| 2012/0047034 | A1* | 2/2012 | Luongo | G06Q 30/04 |
| | | | | 705/17 |
| 2013/0085913 | A1* | 4/2013 | Luongo | G06Q 40/123 |
| | | | | 705/31 |
| 2014/0039999 | A1* | 2/2014 | Levene | G06Q 20/14 |
| | | | | 705/16 |
| 2014/0089183 | A1* | 3/2014 | Allen | G06Q 20/24 |
| | | | | 705/41 |
| 2014/0101037 | A1* | 4/2014 | Ornce | G06Q 20/409 |
| | | | | 705/40 |
| 2014/0129435 | A1* | 5/2014 | Pardo | G06Q 20/3572 |
| | | | | 705/41 |
| 2014/0180925 | A1* | 6/2014 | Fordyce, III | G06Q 20/405 |
| | | | | 705/44 |
| 2014/0279524 | A1* | 9/2014 | Slusser | G06Q 20/0855 |
| | | | | 705/44 |
| 2015/0032626 | A1* | 1/2015 | Dill | H04L 9/32 |
| | | | | 705/44 |
| 2015/0120561 | A1* | 4/2015 | Ver Hulst | G06Q 20/409 |
| | | | | 705/44 |
| 2016/0063201 | A1* | 3/2016 | Allen | G06Q 20/351 |
| | | | | 705/2 |
| 2016/0148212 | A1* | 5/2016 | Dimmick | G06Q 20/386 |
| | | | | 705/44 |
| 2016/0232308 | A1* | 8/2016 | Allen | G06Q 10/10 |
| 2017/0091772 | A1* | 3/2017 | Piel | G06Q 20/40 |
| 2017/0300879 | A1* | 10/2017 | Subramanian | G06Q 20/00 |
| 2017/0364780 | A1* | 12/2017 | Nambiar | G06Q 40/12 |
| 2020/0134609 | A1* | 4/2020 | Leavitt | G06Q 20/38215 |
| 2020/0302459 | A1* | 9/2020 | Chepe | G07G 1/0036 |
| 2020/0320494 | A1* | 10/2020 | Chepe | G06Q 40/02 |

OTHER PUBLICATIONS

F. Zhang, S. Muftic and G. Schmoelzer, "Secure service-oriented architecture for mobile transactions," 2011 World Congress on Internet Security (WorldCIS-2011), 2011, pp. 133-138, doi: 10.1109/WorldCIS17046.2011.5749898. (Mobile) (Year: 2011).*

K. Kreos, E. Täks, V. Tsap, I. Pappel and D. Draheim, "On Facilitating Cross-Border E-Commerce Through an Automated VAT Declaration System," 2019 Sixth International Conference on eDemocracy & eGovernment (ICEDEG), 2019, pp. 56-63 ( E-Commerce) (Year: 2019).*

M. J. Mampaey, "Secure remittance transaction to bankless consumers in a fragmented applications market," in Bell Labs Technical Journal, vol. 16, No. 2, pp. 219-233, (Secure) (Year: 2012).*

* cited by examiner

METHODS AND SYSTEMS FOR FACILITATING ACCESS OF INTERCHANGE PARAMETERS TO A PLURALITY OF DIGITAL APPLICATIONS

CROSS REFERENCE TO RELATED APPLICATION

This application claims priority to Singapore Patent Application No. 10201903109Y, filed Apr. 8, 2019, entitled "Methods and Systems for Facilitating Access of Interchange Parameters to a Plurality of Digital Applications", the entirety of which is incorporated by reference.

TECHNICAL FIELD

The present disclosure generally relates to processing of card payment transaction. More particularly, the disclosure relates to methods and systems for providing quick access of data or information related to different payment servers using a central processing platform, where the information is required for the processing of the card payment transaction.

BACKGROUND

Users perform financial transactions, whether in store or online, to purchase any product/services, withdraw cash, perform a business deal etc. The authorization, clearing and settlement processing for any financial transaction are handled by financial entities and interchanges. Different interchanges have different set of data files which they publish on a regular basis to their members such as acquiring banks, issuing banks etc. The acquiring banks and issuing banks utilize multiple processing applications which handle payment processing operations for different kind of financial transactions. For example, an automated teller machine (ATM) processing application specifically handles operations required for ATM transactions. The multiple processing applications interact with multiple interchanges to gather data required for performing the operations related to the financial transaction.

In the conventional scenario, multiple processing applications operate in individual manners in terms of uploading the set of data files published by the interchanges, managing and updating those set of data files in their local system. The multiple processing applications, even though working under a common platform, do not share the set of data files and hence work as separate teams. This results in high level of redundancy in terms of uploaded data files in each processing application, maintenance of the data files etc.

SUMMARY

Various example embodiments of the present disclosure provide methods, systems, user devices and computer program products for facilitating access of interchange parameter data files through a centralized microservice system that integrates a plurality of interchange network systems with a plurality of payment processing applications. Various example embodiments further provide a platform architecture facilitated by the microservice system that facilitates storage of the interchange related data files in a central database. Further, the platform architecture facilitates access of the interchange related data files from the central database to each of the plurality of payment processing applications.

In an embodiment, a microservice system for facilitating access of interchange parameter data files of a plurality of interchange network systems to a plurality of payment processing applications is disclosed. The microservice system includes a database comprising a memory and a plurality of microservices. The memory stores instructions and the plurality of microservices stores interchange related information sourced from a plurality of interchange network systems. The microservice system includes the plurality of payment processing applications configured to process payment transactions. The microservice system includes a processor configured to execute the stored instructions. The microservice system is caused to perform accessing the interchange related information sourced from the plurality of interchange network systems. The microservice system is further caused to perform storing the interchange related information in the plurality of microservices. The microservice system is further caused to perform facilitating registration of a plurality of financial entities with the microservice system for availing services associated with the plurality of payment processing applications. The microservice system is further caused to perform receiving a request from a payment processing application of the plurality of payment processing applications to access the interchange related information, upon registration of a financial entity of the plurality of financial entities with the microservice system. The microservice system is further caused to provide the interchange related information to the payment processing application.

In another embodiment, a method for facilitating access of interchange parameter data files of a plurality of interchange network systems to a plurality of payment processing applications is disclosed. The method includes, by a microservice system, accessing the interchange related information sourced from the plurality of interchange network systems. The method includes storing, by the microservice system, the interchange related information in the plurality of microservices. The method further includes facilitating, by the microservice system, registration of a plurality of financial entities with the microservice system for availing services associated with the plurality of payment processing applications. The method further includes upon registration, by the microservice system, of a financial entity of the plurality of financial entities with the microservice system, receiving a request from a payment processing application of the plurality of payment processing applications to access the interchange related information. The method further includes providing, by the microservice system, the interchange related information to the payment processing application In another embodiment, another method for facilitating access of interchange parameter data files of a plurality of interchange network systems to a plurality of payment processing applications is disclosed. The method includes, by a microservice system, accessing the interchange related information sourced from the plurality of interchange network systems. The method includes storing, by the microservice system, the interchange related information in the plurality of microservices. The method further includes facilitating, by the microservice system, registration of a plurality of financial entities with the microservice system for availing services associated with the plurality of payment processing applications. The method further includes upon registration, by the microservice system, of a financial entity of the plurality of financial entities with the microservice system, receiving a service request from at least one financial entity for accessing at least one payment processing application of the plurality of payment processing applications. The method further includes sending, by the microservice system, the service request to the at least one payment processing application. The method further includes receiving, by the microservice system, a request from a payment processing application of the plurality of payment processing applications to access the interchange related information. The method further includes providing, by the microservice system, the interchange related information to the payment processing application

BRIEF DESCRIPTION OF THE FIGURES

For a more complete understanding of example embodiments of the present technology, reference is now made to the following descriptions taken in connection with the accompanying drawings in which.

Figure 1:
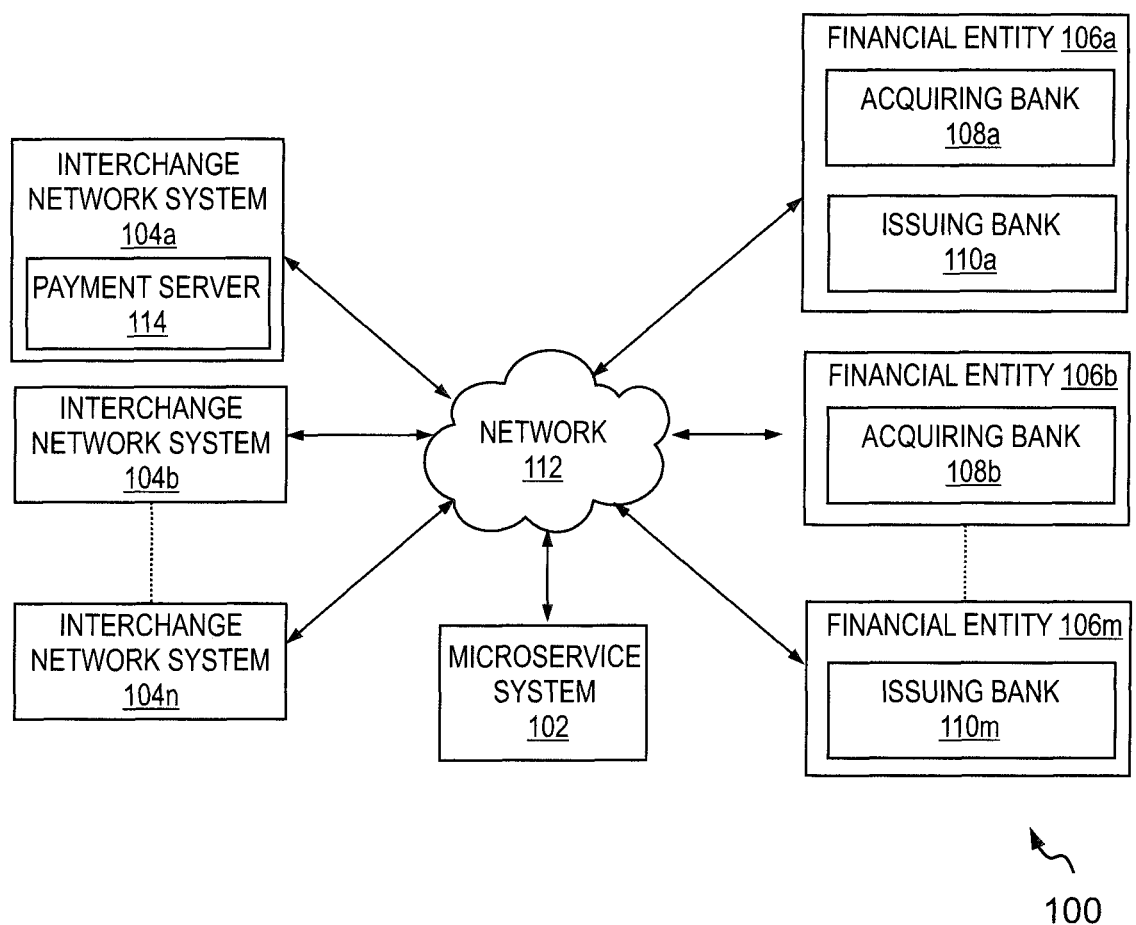
FIG. 1 illustrates an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "financial entity" used throughout the description refers to server which corresponds to, but not limited to, at least one of an issuing bank or an acquiring bank.

In a conventional payment system, a financial entity called the "issuer bank" or "issuing bank" is associated with an issuing server that issues a payment card, such as a credit card, to a consumer, who uses the payment card to tender payment for a purchase from a merchant. To accept payment with the payment card, the merchant must normally establish an account with another financial entity that is part of the payment system. This financial entity is usually called the "acquiring bank." When the consumer tenders payment for a purchase with the payment card, the merchant requests authorization from the acquiring bank for the amount of the purchase. The request may be performed over the telephone, but is usually performed through the use of a point-of-sale (POS) terminal, which reads the consumer's account information from the magnetic stripe or chip present in the payment card and communicates electronically with the transaction processing computers of the merchant bank. Alternatively, the merchant bank may authorize a third party to perform transaction processing on its behalf. In this case, the point-of-sale terminal will be configured to communicate with the third party. Such a third party is usually called a "payment server" or an "interchange network system."

The term "issuing bank" used herein refers to a financial entity associated with an issuing server that holds a financial account that is used to fund the financial transaction (interchangeably referred to as "card payment transaction") of a cardholder. Further, the term "acquiring bank" used herein refers to a financial entity associated with an acquiring server that holds a financial account of a merchant or any entity which receives the fund from the issuing server. The financial accounts in each of the issuing server and the acquiring server may be associated with an entity such as an individual person, a family, a commercial entity, a company, a corporation, a governmental entity, a non-profit organization and the like. In some scenarios, the financial account may be a virtual or temporary payment account that can be mapped or linked to a primary payment account, such as those accounts managed by PayPal®, and the like.

The term "payment card" herein refers to a physical or virtual card linked with a financial or payment account that may be presented to a merchant or any such facility in order to fund a financial transaction via the associated payment account. Examples of the payment card includes, but are not limited to, debit cards, credit cards, prepaid cards, digital wallet, virtual payment numbers, virtual card numbers, forex card, charge cards and stored-value cards. A payment card may be a physical card that may be presented to the merchant for funding the payment. Alternatively, or additionally, the payment card may be embodied in form of data stored in a user device, where the data is associated with payment account such that the data can be used to process the financial transaction between the payment account and a merchant's financial account.

The term "interchange network system", used herein, refers to a network or collection of systems used for transfer of funds through use of cash-substitutes. Interchange network systems may use a variety of different protocols and procedures in order to process the transfer of money for various types of transactions. Transactions that may be performed via an interchange network system may include product or service purchases, credit purchases, debit transactions, fund transfers, account withdrawals, etc. Interchange network systems may be configured to perform transactions via cash-substitutes, which may include payment cards, letters of credit, checks, financial accounts, etc. Examples of networks or systems configured to perform as interchange network system include those operated by Mastercard®, VISA®, Discover®, American Express®, etc.

Overview

Various example embodiments of the present disclosure provide methods, systems, and computer program products for facilitating access of interchange parameter data files through a centralized microservice system, wherein the microservice system integrates a plurality of interchange network systems with a plurality of payment processing applications. Various example embodiments further provide a platform architecture facilitated by the microservice system, wherein the platform facilitates storage of the interchange parameter data files in a central database. Further, the platform architecture facilitates access of the interchange parameter data files from the central database to each of the plurality of payment processing applications. The interchange parameter data files include interchange related information such as bin range, merchant category codes, currency conversion rates, business service rules, message reason codes, country codes, region codes, currency codes, stop list reasons/warning bulletins etc.

The central database in the microservice system includes a plurality of microservices. Each microservice stores a type of interchange parameter of the interchange parameter data files published by respective interchange network system for example, but not limited to, Microservice1 stores VISA® Bin range, Microservice2 stores VISA® currency conversion rates, Microservice3 stores Mastercard® Bin range, Microservice4 stores Mastercard® currency conversion rates etc.

The payment processing applications may not be limited to only mobile or web applications, but also include, cloud applications, or any other interaction channel which can perform operations for financial transactions, and through which a user/customer can interact with the microservice system. The payment processing applications may be managed and hosted by the microservice system and can be accessed by users via user devices such as mobile phones, desktop computer, or any electronic device with communication capabilities. In some scenarios, the payment processing applications can be made available on application store hosted by respective organization and are downloadable from the application stores to be accessed on user devices.

The microservice system sends a first registration request to get registered at different interchange network systems located in different operating regions to get access of their respective interchange related data files. Upon registration in each interchange network system per operating region, the microservice receives a unique processor identification (ID) from each interchange network system per operating region. For example, if an interchange_1 is operating at three different regions (e.g. region1, region2, and region3), the microservice system will get registered at each of the regions i.e. region1, region2, and region3, and receives a unique ID i.e. $ID_A$, $ID_B$, and $ID_C$) from the region 1, region2, and region3, respectively.

The microservice system further facilitates registration of a plurality of financial entities, who are interested in services provided by the plurality of payment processing applications hosted by the microservice system, based on receiving a second registration request from the plurality of financial entities. A unique member ID is assigned to each financial entity of the plurality of financial entities who are registered with the microservice system.

The plurality of payment processing applications can be broadly classified into, but not limited to, two categories i.e. issuing applications and acquiring applications. The issuing applications handle payment processing related to operations performed at the issuing banks such as operations related to debit card payments, credit card payment or prepaid card payments. Therefore, the issuing applications can be categorized into, but not limited to, Credit Application (App), Debit App and Prepaid App which handle operations respective to credit card, debit card and prepaid card. The acquiring applications handle payment processing related to operations performed at acquiring banks such as operations related to ATM, POS and payment gateway (PG). Therefore, the acquiring applications can be categorized into, but not limited to, ATM App, POS App, and PG App.

Whenever a service request is received from at least one financial entity of the plurality of financial entities for an operation related to a payment transaction, the microservice system authenticates the service request and determines whether the financial entity has opted for the service required for the operation related to the payment transaction. During the registration at the microservice system the financial entity should select the services it would like to use and accordingly the financial entity is authorized to use respective payment processing applications for the selected services. Upon successful authentication, the microservice system directs the service request to respective payment processing application for performing the operation. Alternatively, the financial entity can have a portal installed at its local system to access the payment processing application.

When the payment processing application receives the service request to perform the operation related to the payment transaction, the payment processing application sends a request to the microservice system for access of interchange parameter data files required to perform the operation. The microservice system determines the respective microservices storing the interchange parameter data files requested by the payment processing application and provides the access of the determined microservices to the payment processing application.

Therefore, the plurality of payment processing applications can directly access the interchange parameter data files required for performing operations related to the payment transactions without the need of storing and maintaining the interchange parameter data files on their own. Only one file per interchange parameter per interchange per region is stored instead of multiple files for same interchange parameter per interchange per region. Hence various embodiments provide technical effect of eliminating redundancy of uploading, storing and maintaining of interchange parameter data files, and these embodiments are described herein with reference to FIGS. 1 to 10.

FIG. 1 illustrates an example representation of an environment 100 related to at least some example embodiments of the present disclosure. The environment 100 is exemplarily shown including a microservice system 102, interchange network systems 104a, 104b . . . 104n, and financial entities 106a, 106b . . . 106m. Each of the financial entities 106a-n includes at least one of an acquiring bank and an issuing bank. For instance, as illustrated, the financial entity 106a is shown as with an acquiring bank 108a and an issuing bank 110a, the financial entity 106b is shown as with an acquiring bank 108b, and the financial entity 106m is shown as with an issuing bank 110m. The interchange network systems 104a comprises a payment server 114 to communicate with the microservice system 102. Please note that the payment server 114 is shown only in interchange network systems 104a for the purpose of clarity, however remaining interchange network systems 104b, . . . 104n may also comprise the payment server 114.

An issuing bank such as the issuing bank 110a of the financial entity 106a, in which a cardholder may have an issuer account, issues one or more payment cards, such as a credit card, a debit card or a prepaid card, is associated with an issuing server. The payment cards are linked to an issuer account associated with a unique payment account number of the cardholder. The cardholder can use any of the payment cards to tender payment for the purchase. The issuing bank is responsible for determining whether a customer's issuer account is in good standing and whether the purchase is covered by the customer's available credit line or account balance. Based on these determinations, the payment transaction associated with the payment transaction request is approved or declined. The payment cards used by the cardholder are issued by the issuing bank 110a in also in association with an interchange payment network, for example, the interchange payment network 104a.

An acquiring bank such as acquiring bank 108b of the financial entity 106b, in which the merchant may have a merchant account, is associated with an acquiring server which communicates with the issuing server via the payment server 114 to determine whether the cardholder's account is in good standing and whether the transaction amount of the purchase is covered by the cardholder's available account balance. Based on these determinations, authorization of the transaction is declined or accepted. When the authorization is accepted, the available balance of cardholder's account is decreased.

The microservice system 102, the interchange network systems 104a-n and the financial entity 106a-m are communicatively coupled with each other via the network 112.

In an example embodiment, the microservice system 102 sends a first registration request for registration to the interchange network systems 104a-n to access interchange parameter data files. Upon receiving the first registration request, each of the interchange network systems 104a-n performs registration and assigns a unique processor ID to the microservice system 102. Each of the interchange network systems 104a-n sends the approval message of registration along with the assigned unique processor ID to the microservice system. 102

The interchange network systems 104a-n publish their interchange parameter data files to their registered member on a daily basis, at predetermined intervals, or based on change in any of the parameter in the interchange parameter data files. The interchange parameter data files include interchange related information such as bin range, merchant category codes, currency conversion rates, business service rules, message reason codes, country codes, region codes, currency codes, stop list reasons/warning bulletins etc. The microservice system 102 being the registered member also receives the interchange parameter data files on a daily basis, at the predetermined intervals, or based on change in any of the parameter in the interchange parameter data files. The microservice system 102 uploads the received interchange parameter data files in its central database post verifying the parameters in the interchange parameter data files. The microservice system 102 uploads, tests and maintains the interchange parameter data files.

Each of the financial entities 106a-m sends a second registration request to the microservice system 102 for getting registered with the microservice system 102 to avail the services provided by the microservice system 102. The services are related to processing of the payment transaction.

During the registration process, each of the financial entities 106a-m provides details such as name of the financial entity, operating region of the financial entity, name of the interchange network system with which the financial entity is associated, services in which the financial entity is interested. Upon successful registration, the microservice system 102 assigns a unique member ID to each of the financial entities 106a-m. The details provided by the financial entities 106a-m are stored in the central database for future reference along with the assigned unique member ID. The microservice system 102 sends an approval of registration to the financial entities 106a-m along with the assigned unique member ID to the financial entities 106a-m.

Each of the financial entities 106a-m sends a service request for availing a service selected during the registration with the microservice system 102. An example of the service request includes, but not limited to, a request for a credit card payment processing settlement. The microservice system 102 selects an appropriate payment processing application of a plurality of payment processing applications 310 (shown in FIG. 3) hosted by the microservice system 102 for performing operations related to processing of the payment transaction, for example, but not limited to Credit application. The service request is directed to the selected payment processing application.

The plurality of payment processing applications can be broadly classified into, but not limited to, two categories i.e. issuing applications and acquiring applications. The issuing applications handle payment processing related to operations performed at the issuing banks such as operations related to debit card payments, credit card payment or prepaid card payments. Therefore, the issuing applications can be categorized into, but not limited to, Credit App, Debit App and Prepaid App which handle operations respective to credit card, debit card and prepaid card. The acquiring applications are configured to handle payment processing related to operations performed at acquiring banks such as operations related to ATM, POS and payment gateway (PG). The acquiring applications can be categorized into, but not limited to, ATM App, POS App, and PG App.

Whenever the service request is received from at least one financial entity of the plurality of financial entities 106a-m for an operation related to a payment transaction, the microservice system 102 authenticates the service request and determines whether the financial entity has opted for the service required for the operation related to the payment transaction. During the registration at the microservice system 102, a financial entity of the financial entities 106a-m should select the services it would like to use and accordingly the financial entity is authorized to use respective payment processing applications for the selected services. Upon successful authentication, the microservice system 102 directs the service request to respective payment processing application for performing the operation. Alternatively, the financial entity can have a portal installed at its local system to access the payment processing application.

The microservice system 102 includes a plurality of microservices 314 (shown in FIG. 3) as a part of the central database. Each microservice of the plurality of microservices 314 stores a type of interchange parameter of the interchange parameter data files published by respective interchange network system for example, but not limited to, Microservice1 stores VISA® Bin range, Microservice2 stores VISA® currency conversion rates, Microservice3 stores Mastercard® Bin range, Microservice4 stores Mastercard® currency conversion rates etc. It should be noted that the plurality of payment processing applications can be part of the microservice system 102 or they can be separate entity.

Once the payment processing application receives the service request for processing of the payment transaction, the payment processing application sends a request to access interchange parameter data files stored in at least one microservice of the plurality of microservices 314. The microservice system 102 provides access of the requested interchange parameter data files stored in at least one microservice of the plurality of microservices 314 to the payment processing application. Since the interchange parameter data files are stored in separate microservices based on type of the interchange parameter, name of the interchange and region of the interchange, the plurality of the payment processing applications can access same parameter data files stored in the at least one microservice of the plurality of microservices simultaneously in real time. This minimizes the real time required to perform operations of the payment transaction.

Figure 2:
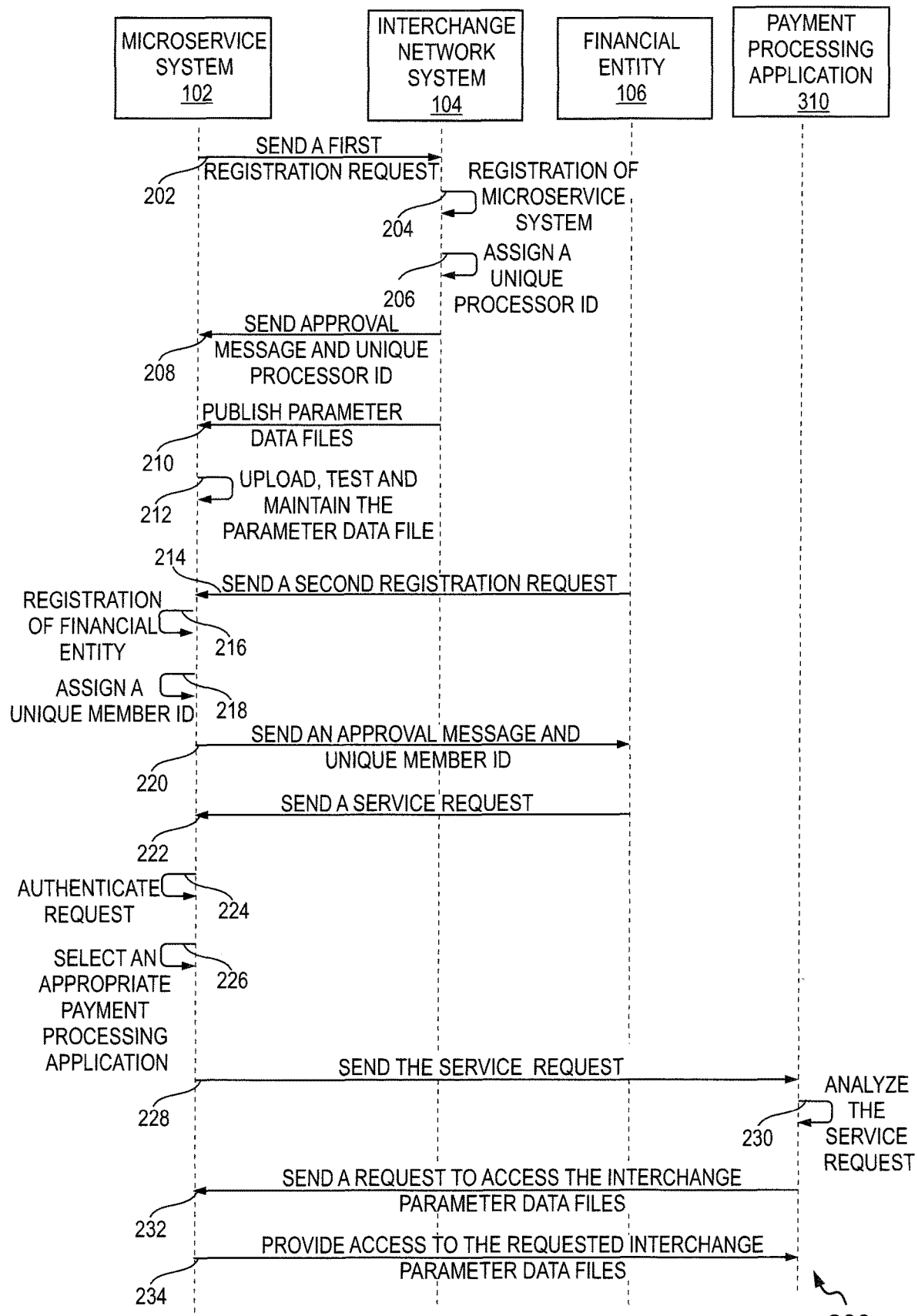
FIG. 2 is sequence flow diagram representing a method of facilitating access of interchange parameter data files to a plurality of payment processing applications simultaneously, in accordance with an example embodiment.

FIG. 2 illustrates a sequence flow diagram representing a method 200 of facilitating access of interchange parameter data files to a plurality of payment processing applications simultaneously in accordance with an example embodiment. The sequence of operations of the flow diagram 200 may not be necessarily executed in the same order as they are presented. Further, one or more operations may be grouped together and performed in form of a single step, or one operation may have several sub-steps that may be performed in parallel or in sequential manner. The flow diagram 200 is explained herewith using the microservice system 102, an interchange network system 104, a financial entity 106 and a payment processing application 310. The interchange network system 104 is an example of interchange network systems 104a-n, and the financial entity 106 is an example of any of the financial entities 106a-m.

At 202, the microservice system 102 sends a first registration request for registration to at least one interchange network system 104 to access interchange parameter data files. At 204, upon receiving the request, the interchange network system 104 performs registration of the microservice system 102. At 206, the interchange network system 104 assigns a unique processor ID to the microservice system 102.

At 208, the interchange network system 104 sends the approval message of registration along with the assigned unique processor ID to the microservice system 102.

At 210, the interchange network system 104 publishes its interchange parameter data files to the microservice system 102. The interchange parameter data files include interchange related information such as bin range, merchant category codes, currency conversion rates, business service rules, message reason codes, country codes, region codes, currency codes, stop list reasons/warning bulletins etc. The interchange network system 104 publishes its interchange parameter data files to its registered member on a daily basis (or as per predefined intervals) or based on change in any of the parameter in the interchange parameter data files. The microservice system 102, being the registered member, also receives the interchange parameter data files on a daily basis or based on change in any of the parameter in the interchange parameter data files.

At 212, the microservice system 102 uploads the received interchange parameter data files in its central database post verifying the parameters in the interchange parameter data files. The microservice system 102 uploads, tests and maintains the interchange parameter data files on a daily basis or based on change in any of the parameter in the interchange parameter data files.

At 214, the financial entity 106 sends a second registration request for registration to the microservice system 102 to avail the services provided by the microservice system 102. Typically, the services are related to processing of the payment transactions. During the registration process, the financial entity 106 provides details such as name of the financial entity, operating region of the financial entity, name of the interchange network system with which the financial entity is associated, services in which the financial entity 106 is interested.

At 216, the microservice system 102 perform registration of the financial entity 106. In this step of registration, the microservice system 102 registers the financial entity 106 for the services provided in the second registration request. For instance, the financial entity 106 is authorized to use respective payment processing applications for the services registered with the microservice system 102.

At 218, upon successful registration, the microservice system 102 assigns a unique member ID to the financial entity 106. The details provided by the financial entity 106 are stored in the central database for future reference along with the assigned unique member ID.

At 220, the microservice system 102 sends an approval message of registration to the financial entity 106 along with the assigned unique member ID.

At 222, the financial entity 106 sends a service request for availing a service related to operations for processing of the payment transaction. For example, the financial entity 106 requests for a card payment processing settlement.

At 224, the microservice system 102 authenticates the service request and determines whether the financial entity 106 has opted for the service required for the operation related to the payment transaction. During the registration at the microservice system 102 the financial entity 106 should select the services it would like to use and accordingly the financial entity 106 is authorized to use respective payment processing applications 310 for the selected services.

At 226, upon successful authentication the microservice system 102 selects an appropriate payment processing application of the plurality of payment processing applications 310 hosted by the microservice system 102 for performing operations related to processing of the payment transaction. At 220, the microservice system 102 sends the service request to the selected payment processing application. Alternatively, the financial entity 106 can have a portal installed at its local system to access the payment processing application.

The microservice system 102 includes a plurality of microservices 314 (shown in FIG. 3) as a part of the central database. As shown in FIG. 4, each microservice of the plurality of microservices 314 stores a type of interchange parameter of the interchange parameter data files published by respective interchange network system 104. It should be noted that the plurality of payment processing applications can be part of the microservice system 102 or they can be separate entity.

At 230, once the payment processing application 310 receives the service request for processing the payment transaction, the payment processing application 310 analyzes the service request. At 232, the payment processing application 310 sends a request to access interchange parameter data files stored in at least one microservice of the plurality of microservices based on the analysis of the service request.

At 234, the microservice system 102 provides access of the requested interchange parameter data files stored in at least one microservice of the plurality of microservices 314 to the payment processing application 310.

Figure 3:
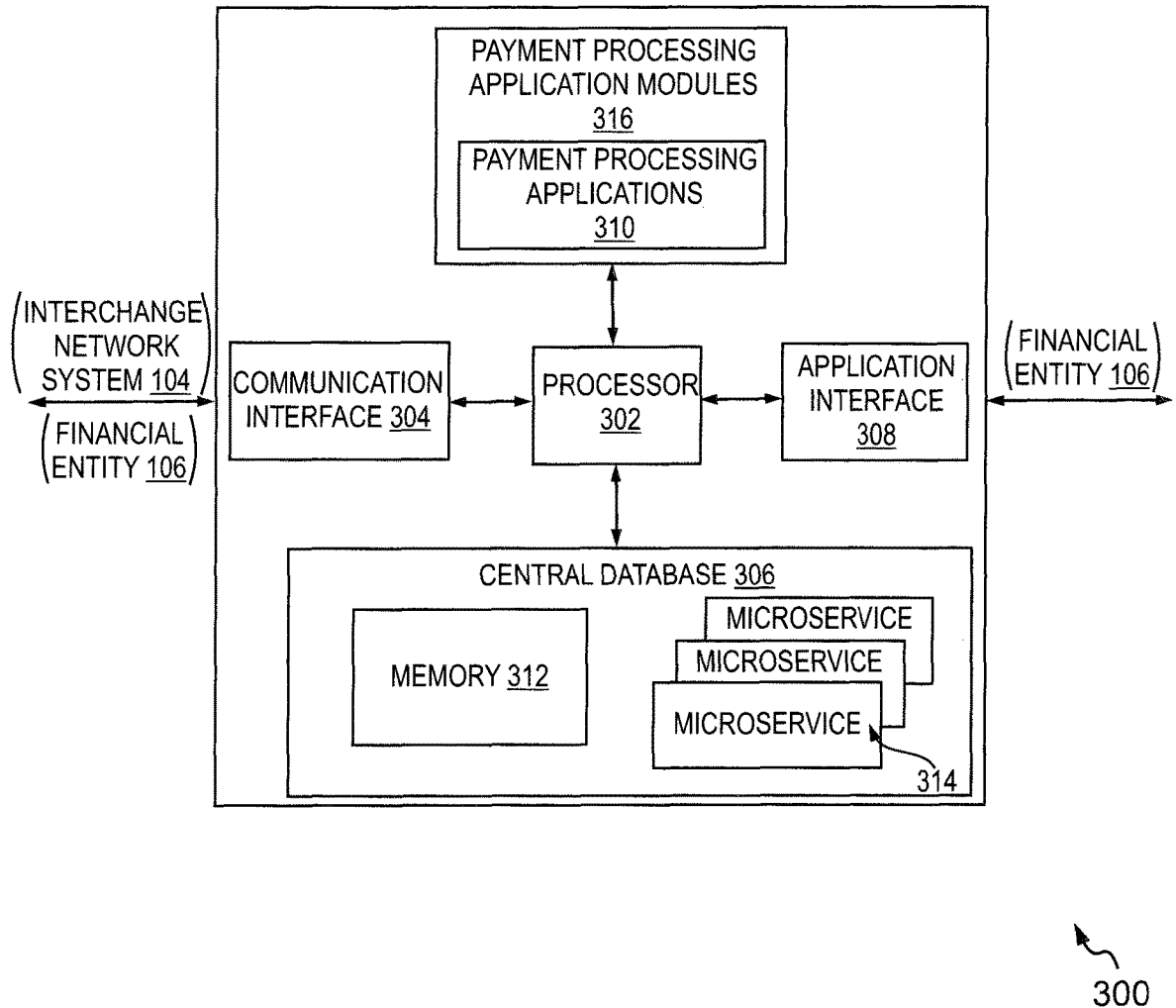
FIG. 3 is simplified block diagram of a microservice system used for facilitating access of interchange parameter data files to a plurality of payment processing applications simultaneously, in accordance with an example embodiment
Figure 4:
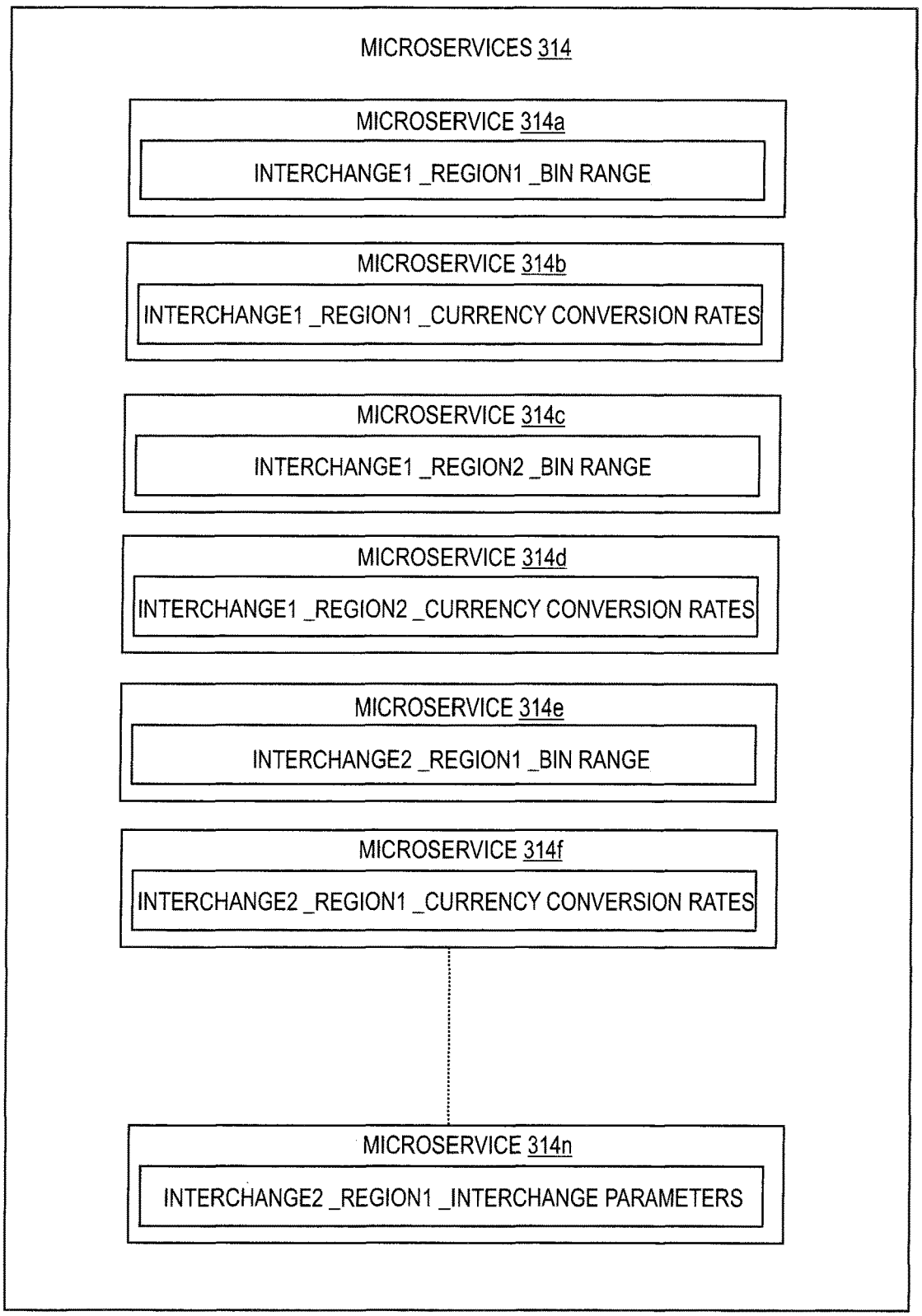
FIG. 4 is an example representation of the plurality of microservices, in accordance with an example embodiment of the present disclosure.

Referring to FIG. 3, a simplified block diagram of a server system such as a microservice system 300 is shown in accordance with one embodiment of the present disclosure. The microservice system 300 is used for facilitating access of interchange parameter data files to a plurality of payment processing applications. Such access may be provided simultaneously to the payment processing applications. The microservice system 300 is an example of the microservice system 102 shown in FIG. 1.

The microservice system 300 includes a processor 302, a communication interface 304, a central database 306, an application interface 308, and a plurality of payment processing application modules 316 hosting a plurality of payment processing applications 310. The central database 306 includes including a memory 312 and a plurality of microservices 314. The one or more of the components in this example may be combined or may be replaced by the processor 302. The components described herein (e.g., the communication interface 304, the processor 324, the central database 306, the application interface 308 and the plurality of payment processing application modules 316) may include hardware and/or software that are configured or programmed to perform the steps described herein.

The communication interface 304 is configured to receive or transmit information between the microservice system 300 and external entities such as the interchange network system 104 and the financial entity 106 via the network 112. The communication interface 304 may receive the interchange parameter data files from the interchange network system 104, via the network 112. The communication interface 304 may further transmit an output information such as the approval and the unique member ID to the financial entity 106 via the network 112.

The communication interface 304 sends a first registration request to the interchange network system 104 for availing access of the interchange parameter data files. The communication interface 304 also receives a second registration request from the financial entity 106 and sends an approval message along with a unique member ID to the financial entity 106. The communication interface 304 may include an Ethernet interface, a radio interface, a microwave interface, or some other type of wireless and/or wired interface. The communication interface 304 may include a transmitter and a receiver. The communication interface 304 may support various wireless and/or wired protocols and standards. For example, the communication interface 308 may support Ultra WideBand (UWB) communication, Bluetooth®, Wireless Fidelity (Wi-Fi), Transport Control Protocol/Internet Protocol (TCP/IP), Institute of Electrical and Electronics Engineers (IEEE) 802.X, Wireless Application Protocol (WAP), or any other type of wireless and/or wired protocol or standard. For example, the communication interface 304 may include a transceiver device (e.g., a modem, a microwave antenna), a remote command unit interface (RCU-IF) or any other types of I/O interface.

The central database 306 includes the memory 312 and the plurality of microservices 314. The central database is a non-relational and flexible database. Examples of the central database 306 may include, but not limited to, NoSQL database such as MongoDB, CouchDB, OrientDB etc. The central database 306 provides quick access to the interchange parameter data files in real time to the plurality of payment processing applications simultaneously.

The memory 312 is configured to store computer-programmable instructions executed by the processor 302 to perform the steps described herein. The memory 312 also stores the unique processor ID assigned to the microservice system 300 from the interchange network system 104 and the unique member IDs assigned to each registered financial entity 106 with the microservice system 300. The memory 312 further stores details provided by the plurality of financial entities during registration with the microservice system 300. Examples of the details include, but not limited to, name of the financial entity, operating region of the financial entity, name of the interchange network system with which the financial entity is associated, services in which the financial entity 106 is interested. Examples of the memory 312 may include a non-removable memory and/or removable memory. The non-removable memory can include RAM, ROM, flash memory, or other well-known memory storage technologies. The removable memory can include flash memory and smart cards. In this example, the memory 312 is a chip (e.g., Integrated Circuit) based storage/memory.

The interchange network system 104 publishes its interchange parameter data files to its registered member on a daily basis or based on change in any of the parameter in the interchange parameter data files. The processor 302 receives the interchange parameter data files via the communication interface 304 on a daily basis or based on change in any of the parameter in the interchange parameter data files. The processor 302 is configured to verify the parameters in the interchange parameter data files. Post verifying the parameters in the interchange parameter data files, the processor 302 uploads the received interchange parameter data files in respective microservice of the plurality of microservices 314.

For uploading the received interchange parameter data files in respective plurality of microservices 314, the processor 302 segregates the interchange parameter data files based on type of interchange parameter for example, but not limited to, bin range, currency conversion rate, merchant current codes, country codes, dispute processing parameters, stop listing reasons, warning bulletins, business service rules etc., type of interchange per region such as Mastercard® Asia region, Mastercard® middle eastern area, VISA® region1 etc. Accordingly, the processor 302 uploads the segregated interchange parameter data files into each microservice of the plurality of microservices 314. The processor 302 uploads, tests and maintains the interchange parameter data files on a daily basis or based on change in any of the parameter in the interchange parameter data files.

The plurality of microservices 314 stores the interchange parameter data files published by different interchange network systems per region. Each microservice of the plurality of microservices stores a type of interchange parameter of the interchange parameter data files published by respective interchange network system 104. It should be noted that the plurality of payment processing application modules 316 can be part of the microservice system 300 or they can be separate entity.

The processor 302 is further configured to receive a service request from the financial entity 106 for availing a service related to operations for processing of the payment transaction, for example, but not limited to, the financial entity 106 requests for a card payment processing settlement. The processor 302 authenticates the service request and determines whether the financial entity 106 has opted for the service required for the operation related to the payment transaction.

The processor 302 is further configured to select an appropriate payment processing application of the plurality of payment processing applications for performing operations related to the processing of the payment transaction. The service request is directed to the selected payment processing application. Alternatively, the financial entity 106 can have a portal installed at its local system to access the payment processing application via the application interface 308.

In an example, the processor 302 may include one or more processors, microprocessors, data processors, co-processors, network processors, application specific integrated circuits (ASICs), controllers, programmable logic devices, chipsets, field programmable gate arrays (FPGAs), and/or some other component(s) that may interpret and/or execute instructions and/or data. The processor 304 may control the overall operation of the microservice system 300 based on an operating system and/or various applications.

The payment processing applications 310 correspond to digital applications. The payment processing applications 310 are configured to process payment transactions associated with the financial entities 106 registered with the microservice system 300. The payment processing applications 310 can be broadly classified into, but not limited to, two categories i.e. issuing applications and acquiring applications.

Examples of the payment processing applications 310 includes, but not be limited to, mobile or web applications, cloud applications, or any other interaction channel which can perform operations for financial transactions, and through which a user/customer can interact with the microservice system 300.

Alternatively, the payment processing applications 310 may be managed and hosted by the microservice system 300 and can be accessed by users via user devices such as mobile phones, desktop computer, or any electronic device with communication capabilities. In some scenarios, the payment processing applications 310 can be made available on application store hosted by respective organization and are downloadable from the application stores to be accessed on user devices.

The application interface 308 is configured to receive the service request from the financial entity 106 made via a portal installed at the financial entity system and directs the request to the respective payment processing application 310. Examples of the application interface includes, but not limited to, remote API, web API, REST API etc.

FIG. 4 illustrates example of the plurality of microservices 314 in conjunction with FIG. 3, in accordance with an example embodiment of the present disclosure.

In an example embodiment, the plurality of microservices 314 includes microservices 314a, 314b, 314c, 314d, 314e, 314f, . . . 314n storing interchange parameter data files related to interchange1_region1 bin range, Interchange1_region1 currency conversion rates, interchange1_region2 bin range, interchange1_region2 currency conversion rates, Interchange2_region1 bin range, Interchange2_region1 currency conversion rates, and so on respectively.

The interchange network system 104 per operating region (for example, Interchange 1 in Asian region) publishes on daily basis its interchange parameter data files to the registered member including the microservice system 300.

The plurality of microservices 314 stores the interchange parameter data files in organized manner and further provides access of the interchange parameter data files to the plurality of payment processing applications 110 simultaneously. The plurality of microservices 314 and the plurality of payment processing applications work under single processor 302 in the microservice system 300 as shown in FIG. 3 and therefore the real-time response for any request for payment transaction processing is faster than conventional processing platform.

Figure 5A:
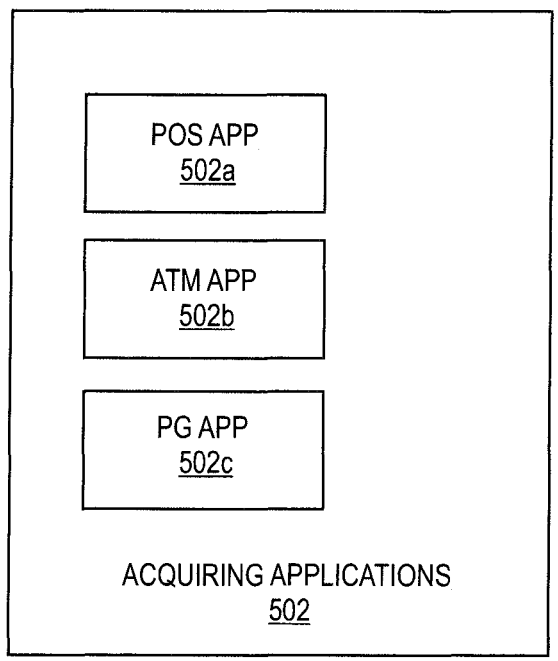
FIGS. 5A and 5B illustrate example representations of the payment processing applications, in accordance with an example embodiment of the present disclosure.
Figure 5B:
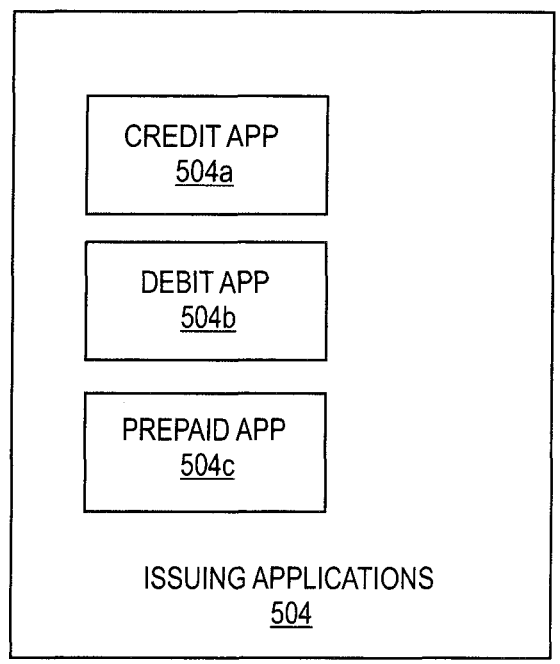

FIGS. 5A and 5B illustrate examples of the payment processing applications 310, in accordance with an example embodiment of the present disclosure.

The plurality of payment processing applications 310 corresponds to digital applications. The plurality of payment processing applications 310 are configured to process payment transactions associated with the financial entities 106 registered with the microservice system 102. The payment processing applications 310 can be broadly classified into, but not limited to, two categories i.e. issuing applications and acquiring applications.

FIG. 5A illustrates the acquiring applications 502 configured to handle payment processing related to operations performed at acquiring banks such as operations related to ATM, POS and payment gateway (PG). Therefore, the acquiring applications can be categorized into, but not limited to, ATM App 502a, POS App 502b, and PG App 502c.

FIG. 5B illustrates the issuing applications 504 configured to handle payment processing related to operations performed at the issuing banks such as operations related to debit card payments, credit card payment or prepaid card payments. Therefore, the issuing applications can be categorized into, but not limited to, Credit App 504a, Debit App 504b and Prepaid App 504c which handle operations respective to credit card, debit card and prepaid card.

Figure 6:
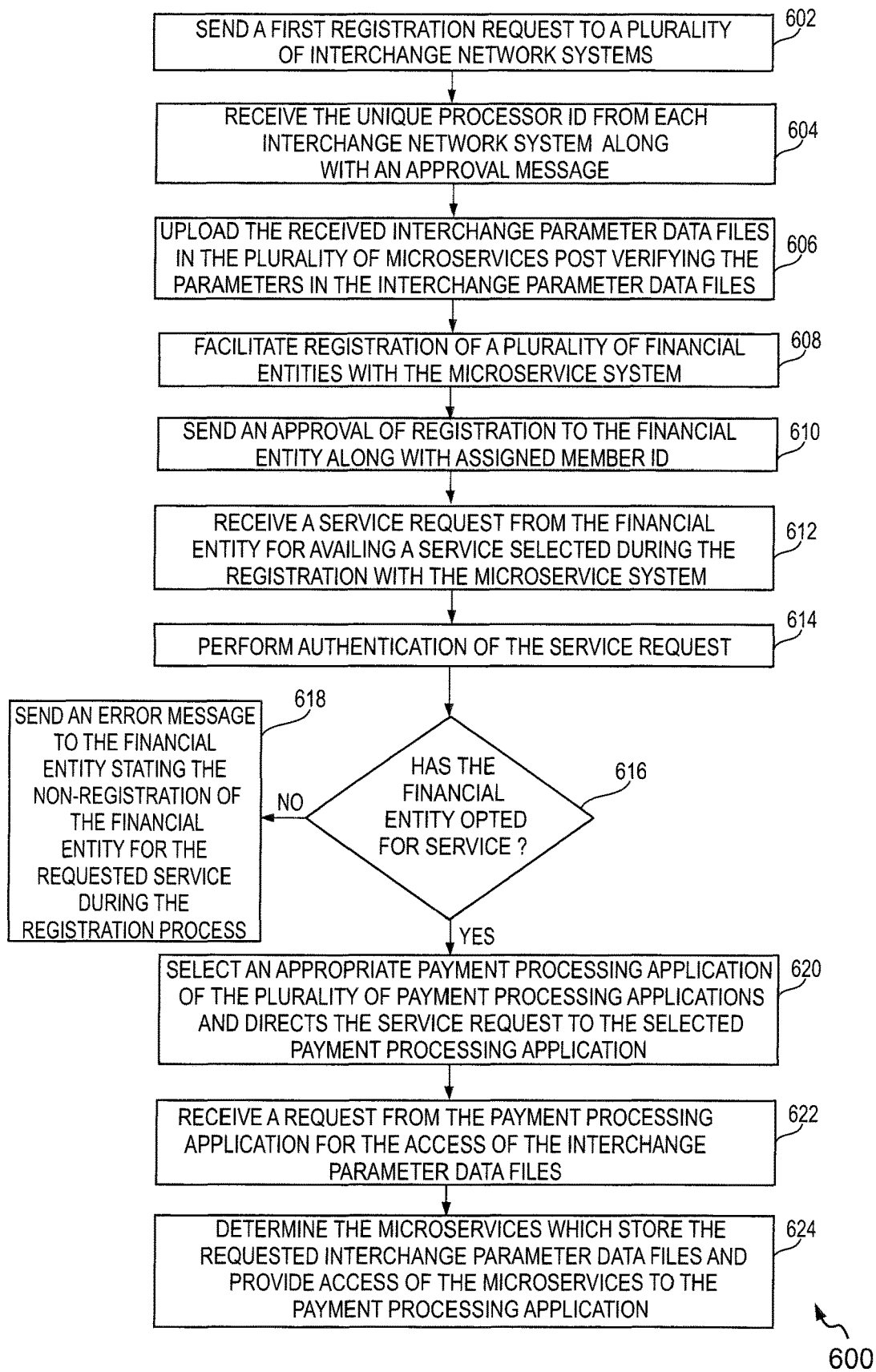
FIG. 6 illustrates a flow diagram representing a method of facilitating access of interchange parameter data files to payment processing applications simultaneously, in accordance with an example embodiment.

FIG. 6 illustrates a flow diagram representing a method 600 of facilitating access of interchange parameter data files to a plurality of payment processing applications simultaneously, in accordance with an example embodiment. The sequence of operations of the flow diagram of the method 600 may not be necessarily executed in the same order as they are presented. Further, one or more operations may be grouped together and performed in form of a single step, or one operation may have several sub-steps that may be performed in parallel or in sequential manner.

At step 602, the processor 302 sends a first registration request, via the communication interface 304, for registration to a plurality of interchange network systems to access respective interchange parameter data files. Upon receiving the first registration request, the interchange network system 104 perform registration and assigns a unique processor ID to the microservice system 102. The interchange network system 104 sends the approval message of registration along with the assigned unique processor ID to the microservice system 102.

At step 604, upon successful registration at each interchange network system of the plurality of interchange network systems 104, the processor 302 receives, via the communication interface 304, the unique processor ID from each interchange network system of the plurality of interchange network systems along with an approval message for the registration request. The interchange network system 104 publishes its interchange parameter data files to its registered members on a daily basis or based on change in any of the parameter in the interchange parameter data files. The microservice system 102, being the registered member, also receives the interchange parameter data files on a daily basis or based on change in any of the parameter in the interchange parameter data files.

At step 606, the processor 302 uploads the received interchange parameter data files in the plurality of microservices 314 post verifying the parameters in the interchange parameter data files. The processor 302 uploads, tests and maintains the interchange parameter data files on a daily basis or based on change in any of the parameter in the interchange parameter data files.

At step 608, the processor 302 facilitates registration of a plurality of financial entities 106a-m with the microservice system 102 for availing services associated with a plurality of payment processing applications. The services are related to the processing of the payment transactions.

During the registration process, the financial entities 106a-m provides details such as name of the financial entity, operating region of the financial entity, name of the interchange network system with which the financial entity is associated, services in which the financial entities 106a-m is interested. Upon successful registration, the processor 302 assigns a unique member ID to the financial entity 106. The details provided by the financial entities 106a-m are stored in the central database 306 for future reference.

At step 610, the processor 302, via the communication interface 304, sends an approval of registration to the financial entity 106 along with the assigned member ID.

At step 612, the processor 302, via the communication interface 304, receives a service request from at least one financial entity 106a for availing a service selected during the registration with the microservice system 102 for example, but not limited to, the financial entity 106a requests for a credit card payment processing settlement.

At step 614, upon receiving the service request from the financial entity 106a, the processor 302 authenticates the service request and determines whether the financial entity 106a has opted for the service required for the operation related to the payment transaction. During the registration at the microservice system 102 the financial entity 106a should select the services it would like to use and accordingly the financial entity 106a is authorized to use respective payment processing applications for the selected services.

At 616, if the financial entity 106a has opted for the service then the method 600 proceeds to step 620 otherwise the method 600 proceeds to step 618.

At step 620, the processor 302 selects an appropriate payment processing application of the plurality of payment processing applications 310 hosted by the microservice system 102 for performing operations related to payment transaction processing and directs the service request to the selected payment processing application.

At step 618, the processor 302, via the communication interface 304, sends an error message to the financial entity 106a stating the non-registration of the financial entity 106a for the requested service during the registration process. Along with the approval message the processor 302 may also send a fresh link to select the requested service using the unique member ID given to the financial entity 106a.

Upon receiving the service request from the microservice system 102, the payment processing application 310 analyzes the service request and determines the required interchange parameter data files to perform the operation for the payment transaction processing.

At step 622, the processor 302 receives a request from the payment processing application for the access of the interchange parameter data files required to perform the operation for processing the payment transaction.

At step 624, the processor 302 determines the microservices 314 which store the requested interchange parameter data files and provide access of the microservices to the payment processing application 310.

Since the interchange parameter data files are stored in separate microservices based on type of the interchange parameter, name of the interchange and region of the interchange, the plurality of the payment processing applications can access same parameter data files stored in the at least one microservice of the plurality of microservices simultaneously in real time. This minimizes the real time required to perform operations of processing the payment transaction.

Figure 7:
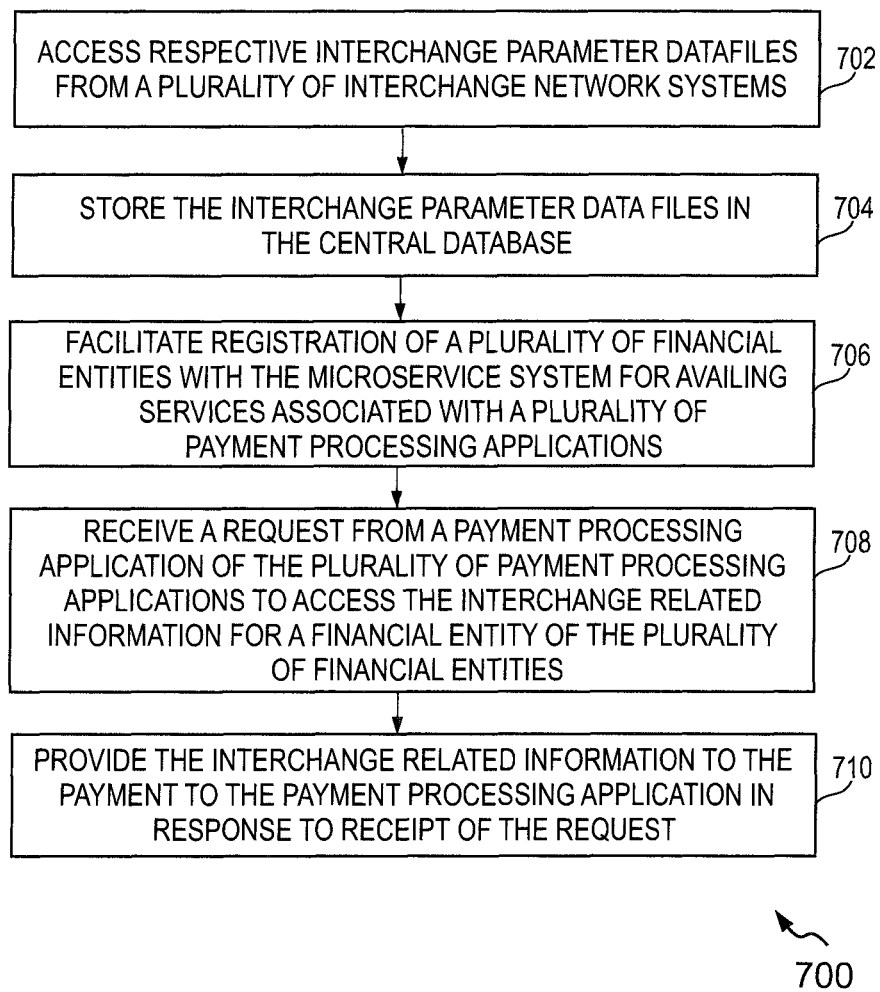
FIG. 7 illustrates a flow diagram representing another method of facilitating access of interchange parameter data files to payment processing applications simultaneously, in accordance with another example embodiment.

FIG. 7 illustrates a flow diagram representing yet another method 700 of facilitating access of interchange parameter data files to a plurality of payment processing application simultaneously, in accordance with an example embodiment.

At step 702, the microservice system 102 accesses interchange parameter data files from a plurality of interchange network systems. The interchange network system 104 performs registration and assigns a unique processor ID to the microservice system 102. The interchange network system 104 sends the approval message of registration along with the assigned unique processor ID to the microservice system 102.

The interchange network system 104 publishes its interchange parameter data files to its registered member on a daily basis or based on change in any of the parameter in the interchange parameter data files. The microservice system 102 being the registered member also receives the interchange parameter data files on a daily basis or based on change in any of the parameter in the interchange parameter data files.

At 704, the microservice system 102 stores the interchange parameter data files in the central database 306. The microservice system 102 uploads, tests and maintains the interchange parameter data files on a daily basis or based on change in any of the parameter in the interchange parameter data files.

At 706, the microservice system 102 facilitates registration of a plurality of financial entities 106 with the microservice system 102 for availing services associated with a plurality of payment processing applications. The services are related to processing of the payment transactions.

During the registration process, the financial entity 106 provides details such as name of the financial entity, operating region of the financial entity, name of the interchange network system with which the financial entity is associated, services in which the financial entity 106 is interested.

At 708, upon registration of a financial entity of the plurality of financial entities with the microservice system 102, the microservice system 102 receives a request from a payment processing application of the plurality of payment processing applications 310 to access the interchange related information for a financial entity of the plurality of financial entities.

The plurality of payment processing applications 310 can be broadly classified into, but not limited to, two categories i.e. issuing applications and acquiring applications. The issuing applications handle payment processing related to operations performed at the issuing banks such as operations related to debit card payments, credit card payment or prepaid card payments. Therefore, the issuing applications can be categorized into, but not limited to, Credit App, Debit App and Prepaid App which handle operations respective to credit card, debit card and prepaid card. The acquiring applications handles payment processing related to operations performed at acquiring banks such as operations related to ATM, POS and payment gateway (PG). Therefore, the acquiring applications can be categorized into, but not limited to, ATM App, POS App, and PG App.

At 710, the microservice system 102 provides the interchange related information to the payment to the payment processing application 310 in response to receipt of the request.

Figure 8:
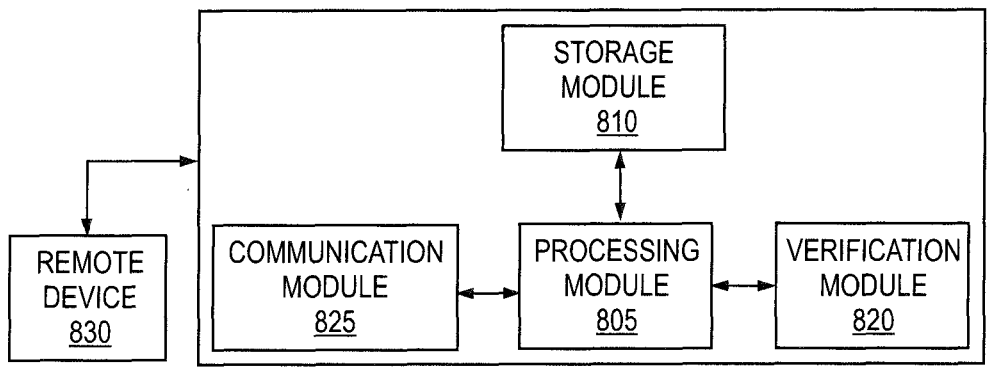
FIG. 8 illustrates a simplified block diagram of an issuing server, in accordance with an example embodiment.

Referring now to FIG. 8, a simplified block diagram of an issuing server 800, in accordance with one embodiment of the present disclosure. The issuing server 800 is an example of server associated with the issuing banks 110a, 110m of FIG. 1. The issuing server 800 is associated with an issuer bank/issuer, in which a cardholder may have an account, which provides a payment card. The issuing server 800 includes a processing module 805 operatively coupled to a storage module 810, a verification module 820 and a communication module 825. The components of the issuing server 800 provided herein may not be exhaustive and that the issuing server 800 may include more or fewer components than that of depicted in FIG. 8. Further, two or more components may be embodied in one single component, and/or one component may be configured using multiple sub-components to achieve the desired functionalities. Some components of the issuing server 800 may be configured using hardware elements, software elements, firmware elements and/or a combination thereof.

The storage module 810 is configured to store machine executable instructions to be accessed by the processing module 805. Additionally, the storage module 810 stores information related to, contact information of the customer, bank account number, availability of funds in the account, payment card details, and/or the like. This information is retrieved by the processing module 805.

The processing module 805 is configured to communicate with one or more remote devices such as a remote device 830 using the communication module 825 over a network such as the network 112 of FIG. 1. The examples of the remote device 830 include the interchange network system 104, the microservice system 102 and the network 120 and the like. The communication module 825 is capable of facilitating such operative communication with the remote devices and cloud servers using API (Application Program Interface) calls. The communication module 825 is configured to send a registration request for using services of the microservice system 102. The communication module 825 is further configured to receive an approval message from the microservice system 102 for the registration request and an assigned unique member ID from the microservice system 102 to access the services of the plurality of payment processing applications 310.

The verification module 820 is configured to verify and validate a customer, the payment card associated with the customer and a PIN of the payment card for approving the transaction. The verification module 820 may also verify if an issuer account of the customer associated with the payment card have good standing balance. The communication module 825 is configured to send notification of approval or decline of a transaction to the merchant.

In some embodiments, the issuing server 800 includes a portal to access the plurality of payment processing applications 310, described with reference to FIGS. 1 and 3. In an example embodiment, an instance of the payment processing applications 310 may be provided by the interchange network system 104 for deploying the payment processing applications 310 in the issuing server 800.

Figure 9:
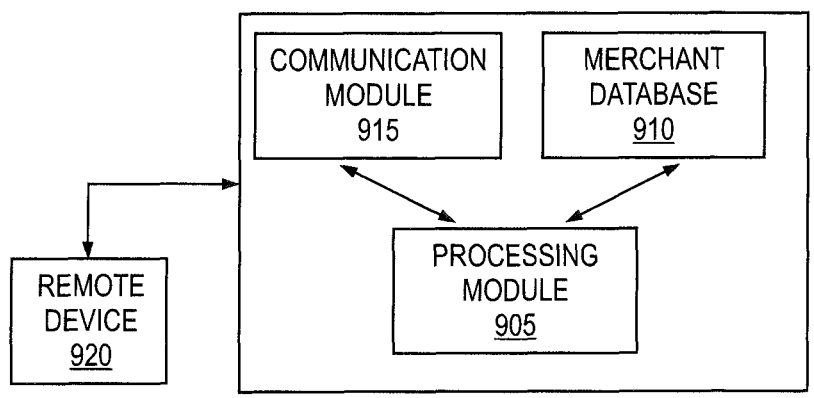
FIG. 9 illustrates a simplified block diagram of an acquiring server, in accordance with an example embodiment.

Referring now to FIG. 9, a simplified block diagram of an acquiring server 900, in accordance with one embodiment of the present disclosure. The acquiring server 900 is associated with the acquiring bank 108 of FIG. 1, which may be associated with a merchant at whose facility the cardholder 110 is purchasing goods. The merchant may have established an account to accept payment for purchase of goods from customers. Further, the acquiring server 900 is configured to facilitate transaction with the issuing server 800 using a network, such as the network 112 of FIG. 1. The acquiring server 900 includes a processing module 905 communicably coupled to a merchant database 810 and a communication module 915. The components of the acquiring server 900 provided herein may not be exhaustive, and that the acquiring server 900 may include more or fewer components than that of depicted in FIG. 9. Further, two or more components may be embodied in one single component, and/or one component may be configured using multiple sub-components to achieve the desired functionalities. Some components of the acquiring server 900 may be configured using hardware elements, software elements, firmware elements and/or a combination thereof.

The merchant database 910 includes a table which stores one or more merchant parameters, such as, but not limited to, a merchant primary account number (PAN), a merchant name, a merchant ID (MID), a merchant category code (MCC), a merchant city, a merchant postal code, an MAID, a merchant brand name, terminal identification numbers (TIDs) associated with merchant terminals (e.g., the POS terminals or any other merchant electronic devices) used for processing transactions, among others. The processing module 905 is configured to use the MID or any other merchant parameter such as the merchant PAN to identify the merchant during the normal processing of payment transactions, adjustments, chargebacks, end-of-month fees, loyalty programs associated with the merchant and so forth. The processing module 905 may be configured to store and update the merchant parameters in the merchant database 910 for later retrieval. In an embodiment, the communication module 915 is capable of facilitating operative communication with a remote device 920 such as the microservice system 102.

In some embodiments, the acquiring server 900 includes a portal to access the plurality of payment processing applications 310, described with reference to FIGS. 1 and 3. In an example embodiment, an instance of the payment processing applications 310 may be provided by the interchange network system 104 for deploying the payment processing applications 310 in the acquiring server 900.

Figure 10:
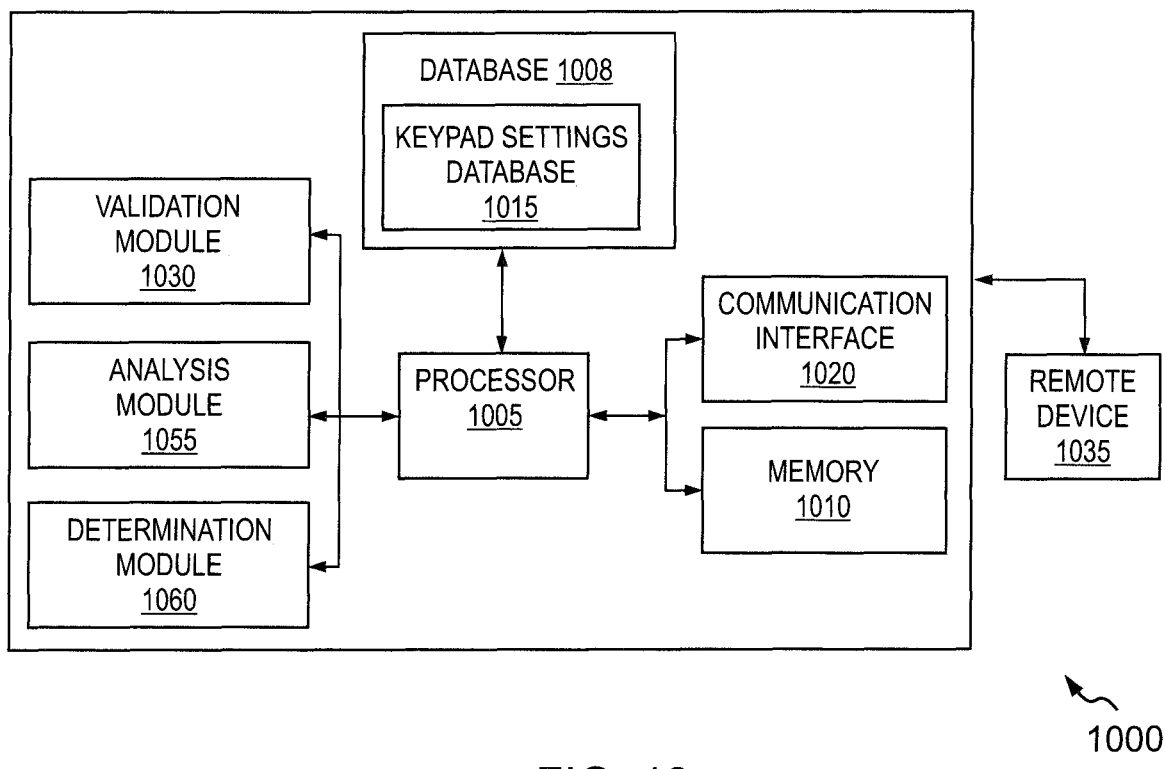
FIG. 10 illustrates a simplified block diagram of a payment server, in accordance with an example embodiment.

FIG. 10 is a simplified block diagram of a payment server 1000 used for facilitating access of interchange parameter data files to a plurality of payment processing applications simultaneously, in accordance with one embodiment of the present disclosure. The payment server 1000 may be an example of the payment server 114, and may correspond to the interchange network system 104 of FIG. 1. The network 112 may be used by the payment server 1000, the issuing server 800 and the acquiring server 900 as a payment interchange network. Examples of payment interchange network include, but not limited to, Mastercard® payment system interchange network. The payment server 1000 includes a processor 1005 configured to extract programming instructions from a memory 1010 to provide various features of the present disclosure. The components of the payment server 1000 provided herein may not be exhaustive and that the payment server 900 may include more or fewer components than that of depicted in FIG. 10. Further, two or more components may be embodied in one single component, and/or one component may be configured using multiple sub-components to achieve the desired functionalities. Some components of the payment server 1000 may be configured using hardware elements, software elements, firmware elements and/or a combination thereof.

Via a communication interface 1020, the processor 1005 receives a transaction request from a remote device 1035 such as the acquiring server 900 or the merchant terminal. The communication may be achieved through API calls, without loss of generality. A keypad settings database 1015 is embodied in a database 1008 of the payment server 1000. The keypad settings database 1015 stores information corresponding to a customized electronic number pad settings of an electronic number pad from a plurality of customers. The keypad settings database 1015 is in operative communication with a validation module 1030, an analysis module 1055, and a determination module 1060.

The determination module 1060 is configured to determine whether microservice system 102 is a registered member or not based on information (for example the unique processor ID) stored in the database 1008 during registration of the microservice system 102 via the communication interface 1020. The determination module 1060 is configured to determine several financial entities associated with the microservice system 102. In some embodiments, the analysis module 1055 receives the registration request from the microservice system 102 and based on analysis of the service request assigns a unique processor ID to the microservice system via the communication interface 1020.

The memory 1010 stores interchange parameter details such as Issuer ID, POS ID, country code, acquirer ID, payment card details, acquirer account information, transaction records, merchant account information, and the like. The customer details, the payment card details, the issuer account balance, etc. are validated using the validation module 1030. The validation module 1030 may include one or more predefined rule sets using which the processor 1005 can process the validation. Further, the processor 1005, upon successful validation, sends interchange parameter to the microservice system 102.

The processor 1005 is further configured to receive the registration request from the microservice system 102 via the communication interface 1020. In one embodiment, the processor 1005 may facilitate a dedicated software application (also referred to as 'the application interface') capable of being installed on the acquiring server 108 or the issuing server 110. The acquiring server 900 (e.g., the acquiring server 108) and the issuing server 800 (e.g., the issuing server 110) may access the application interface for registration and request for the interchange parameter data files. The acquiring server 900 and the issuing server 800 may access the application interface using a web link as well, instead of having a need to install the application on the acquiring server 900 and the issuing server 800.

Without in any way limiting the scope, interpretation, or application of the claims appearing below, a technical effect of one or more of the example embodiments disclosed herein is to provide methods and systems for facilitating access of interchange parameter data files through a centralized microservice system that integrates a plurality of interchange network systems with a plurality of payment processing applications. Various example embodiments further provide a platform architecture facilitated by the microservice system that facilitates storage of the interchange related data files in a central database. Further, the platform architecture facilitates access of the interchange related data files from the central database to each of the plurality of payment processing applications. Since the interchange parameter data files are stored in separate microservices based on type of the interchange parameter, name of the interchange and region of the interchange, the plurality of the payment processing applications can access same parameter data files stored in the at least one microservice of the plurality of microservices simultaneously in real time. This minimizes the real time required to perform operations of processing the payment transaction. Further, the plurality of payment processing applications can directly access the interchange parameter data files required for performing operations related to the payment transactions without the need of storing and maintaining the interchange parameter data files on their own. Therefore, only one file per interchange parameter per interchange per region is stored instead of multiple files for same interchange parameter per interchange per region, hence eliminating redundancy of uploading, storing and maintaining of interchange parameter data files. This results in efficient storage of data and further minimizes the response time, in real time processing, required to perform operations of processing the payment transaction.

The disclosed methods with reference to FIGS. 1 to 10, or one or more operations of the flow diagrams 600 and 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server systems (e.g., the components 104, and 106) and its various components such as the computer system and the database may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A microservice system for minimizing processing time required to process transactions, the system comprising:
   a plurality of microservices that receive interchange parameter data comprising a plurality of parameters, from a plurality of interchange network systems based on the plurality of microservices being registered with the plurality of interchange network systems and that provide simultaneous access to interchange parameter data required by a plurality of payment processing applications, the plurality of microservices and the plurality of payment processing applications being executed by a same processor of the microservice system;
   a database comprising a memory that stores the interchange parameter data, the interchange parameter data being segregated into a plurality of region-wise sets, each set of the plurality of region-wise sets comprising a selected plurality of interchange parameters associated with a specific region, each microservice of the plurality of microservices storing a specific interchange parameter of a set of the plurality of region-wise sets based on a type of the interchange parameter;
   a plurality of payment processing application modules for hosting the plurality of payment processing applications configured to process payment transactions without storing and maintaining the interchange parameter data; and
   the same processor of the microservice system operationally coupled to the memory, for and performing operations comprising:
      registering a plurality of financial entities with the microservice system for availing services associated with the plurality of payment processing applications, a financial entity of the plurality of financial entities being registered based at least on an interchange network system with which the financial entity is associated;
      receiving a request from a payment processing application of the plurality of payment processing applications to access interchange parameter data required for a financial entity of the plurality of financial entities to process a transaction, the required interchange parameter data being determined based on the interchange network system with which the financial entity is associated;
      determining, based on the required interchange parameter data requested by the payment processing application, a microservice of the plurality of microservices that stores the required interchange parameter data;
      accessing the microservice of the plurality of microservices that stores the required interchange parameter data;
      retrieving the required interchange parameter data requested by the payment processing application and providing the accessed interchange parameter data to the payment processing application in response to receipt of the request; and causing the payment processing application to process the transaction using at least the provided interchange parameter data.

2. The microservice system as claimed in claim 1, wherein receiving a request from a payment processing application of the plurality of payment processing applications to access interchange parameter data includes receiving requests from two or more payment processing applications for the interchange parameter data simultaneously, wherein the same processor of the microservice system further performs operations comprising:

retrieving the interchange parameter data requested by the two or more payment processing applications and providing the accessed interchange parameter data to the two or more payment processing application simultaneously in real time.

3. The microservice system as claimed in claim 1, wherein the registration of the plurality of financial entities with the microservice system comprises assigning a member identification (ID) to each financial entity of the plurality of financial entities.

4. The microservice system as claimed in claim 1, wherein accessing the interchange parameter data from the plurality of interchange network systems comprises sending a request for registration of the microservice system to the plurality of interchange network systems.

5. The microservice system as claimed in claim 4, wherein the registration of the microservice system corresponds to registration of the microservice system in each interchange network system based on an operating region of the interchange network system of the plurality of interchange network systems.

6. The microservice system as claimed in claim 5, wherein the registration of the microservice system with each of the plurality of interchange network systems further comprises:

receiving an approval of the request for registration; and
receiving a unique identification (ID) from each operating region of an interchange network system of the plurality of interchange network systems.

7. The microservice system as claimed in claim 1, wherein accessing a microservice of the plurality of microservices that stores a specific interchange parameter from the set of the plurality of region-wise sets that is required by the financial entity includes determining a microservice that stores the specific interchange parameter.

8. The microservice system as claimed in claim 1, wherein the registration of the plurality of financial entities with the microservice system comprises receiving details including name of the financial entity, operating region of the financial entity, name of the interchange network system with which the financial entity is associated, and services in which the financial entity is interested.

9. The microservice system as claimed in claim 1, wherein the processor further performs:

receiving a service request from at least one financial entity for accessing at least one payment processing application of the plurality of payment processing applications; and
sending the service request to the at least one payment processing application.

10. The microservice system as claimed in claim 9, wherein the processor further performs authentication of the service request received from at least one financial entity.

11. A computer-implemented method for using a microservice system, that includes a processor and a database that stores a plurality of microservices, and for minimizing processing time required to process transactions, the method comprising:

receiving, by the plurality of microservices of the microservice system, interchange parameter data comprising a plurality of parameters, from a plurality of interchange network systems based on the plurality of microservices being registered with the plurality of interchange network systems, the plurality of microservices providing simultaneous access to interchange parameter data required by a plurality of payment processing applications, the plurality of microservices and the plurality of payment processing applications being executed by a same processor of the microservice system;

storing, by the database comprising a memory, the interchange parameter data, the interchange parameter data being segregated into a plurality of region-wise sets, each set of the plurality of region-wise sets comprising a selected plurality of interchange parameters associated with a specific region, each microservice of the plurality of microservices storing a specific interchange parameter of a set of the plurality of region-wise sets based on a type of the interchange parameter;

registering, by the microservice system, a plurality of financial entities with the microservice system for availing services associated with a plurality of payment processing applications, a financial entity of the plurality of financial entities being registered based at least on an interchange network system of the plurality of interchange network systems with which the financial entity is associated;

receiving a request from a payment processing application of the plurality of payment processing applications to access interchange parameter data required for a financial entity of the plurality of financial entities to process a transaction, the required interchange parameter data being determined based on the interchange network system with which the financial entity is associated determining, based on the required interchange parameter data requested by the payment processing application, a microservice of the plurality of microservices that stores the required interchange parameter data;

accessing the microservice of the plurality of microservices that stores the required interchange parameter data;

retrieving the required interchange parameter data from the accessed microservice and providing the required interchange parameter data to the payment processing application; and causing the payment processing application to process the transaction using at least the provided interchange parameter data.

12. The method as claimed in claim 11, wherein the interchange parameter data is selected from a group comprising currency conversion rates, business service rules, message reason codes, country codes, region codes, and currency code.

13. The method as claimed in claim 11, further comprising sending a request for registration of the microservice system to the plurality of interchange network systems for accessing the interchange parameter data.

14. The method as claimed in claim 13, further comprising:

receiving an approval of the request for registration; and receiving a unique processor ID from each operating region of an interchange network system of the plurality of interchange network systems.

15. The method as claimed in claim 11, further comprising:
receiving a service request from at least one financial entity for accessing at least one payment processing application of the plurality of payment processing applications; and
sending the service request to the at least one payment processing application.

16. The method as claimed in claim 15, further comprising authenticating the service request received from at least one financial entity.

17. The method as claimed in claim 11, wherein accessing a microservice of the plurality of microservices that stores a specific interchange parameter from the set of the plurality of region-wise sets that is required by the financial entity includes determining a microservice that stores the specific interchange parameter.

18. One or more non-transitory computer storage media having computer-executable instructions for minimizing processing time required to process transactions that, upon execution by a processor of a microservice system, cause the processor to at least:
receive, by a plurality of microservices of the microservice system, interchange parameter data comprising a plurality of parameters, from a plurality of interchange network systems based on the plurality of microservices being registered with the plurality of interchange network systems, the plurality of microservices providing simultaneous access to interchange parameter data required by a plurality of payment processing applications, the plurality of microservices and the plurality of payment processing applications being executed by a same processor of the microservice system;
store, by a database comprising a memory, the interchange parameter data, the interchange parameter data being segregated into a plurality of region-wise sets, each set of the plurality of region-wise sets comprising a selected plurality of interchange parameters associated with a specific region, each microservice of the plurality of microservices storing a specific interchange parameter of a set of the plurality of region-wise sets based on a type of the interchange parameter;
register a plurality of financial entities with the microservice system for availing services associated with a plurality of payment processing applications, a financial entity of the plurality of financial entities being registered based at least on an interchange network system of the plurality of interchange network systems with which the financial entity is associated; and wherein upon registration of a financial entity of the plurality of financial entities with the microservice system, perform:
receiving a service request from at least one financial entity for accessing at least one payment processing application of the plurality of payment processing applications to process a transaction, and sending the service request to the at least one payment processing application;
receiving a request from the at least one payment processing application of the plurality of payment processing applications to access interchange parameter data required for the at least one financial entity to process the transaction, the required interchange parameter data being determined based on the interchange network system with which the financial entity is associated;
determining, based on the required interchange parameter data requested by the payment processing application, a microservice of the plurality of microservices that stores the required interchange parameter data;
accessing the microservice of the plurality of microservices that stores the required interchange parameter data; and
retrieving the required interchange parameter data from the accessed microservice and providing the required interchange parameter data to the at least one payment processing application in response to the request; and
causing the payment processing application to process the transaction using at least the provided interchange parameter data.

19. The one or more non-transitory computer storage media as claimed in claim 18, wherein the computer-executable instructions, upon execution by the processor, further cause the processor to authenticate the service request received from at least one financial entity.

20. The one or more non-transitory computer storage media as claimed in claim 18, wherein the computer-executable instructions, upon execution by the processor, further cause the processor to:
send a request for registration of the microservice system to the plurality of interchange network systems for accessing the interchange parameter data;
receive an approval of the request for registration; and
receive a unique processor ID from each operating region of an interchange network system of the plurality of interchange network systems.

* * * * *